United States Patent [19]
Bull

[11] Patent Number: 5,160,932
[45] Date of Patent: Nov. 3, 1992

[54] OVER-THE-HORIZON SYNTHETIC APERTURE RADAR

[75] Inventor: James G. Bull, Issaquah, Wash.

[73] Assignee: The Boeing Company, Seattle, Wash.

[21] Appl. No.: 553,441

[22] Filed: Jul. 13, 1990

[51] Int. Cl.$^5$ .............................................. G01S 13/90
[52] U.S. Cl. ...................................... 342/25; 342/160
[58] Field of Search ................... 342/25, 107, 160, 161

[56] References Cited

U.S. PATENT DOCUMENTS

| | | | |
|---|---|---|---|
| 3,178,711 | 4/1965 | Case, Jr. | 342/25 |
| 3,243,814 | 3/1966 | Massey | 342/59 |
| 3,603,992 | 9/1971 | Goggins et al. | 342/25 |
| 3,614,778 | 10/1971 | Graham et al. | 342/25 |
| 3,898,657 | 8/1975 | Jensen | 342/107 |
| 3,975,734 | 8/1976 | Payne | 342/25 X |
| 4,325,065 | 4/1982 | Caputi, Jr. | |
| 4,602,257 | 7/1986 | Grisham | |
| 4,675,677 | 6/1987 | von Maydell et al. | 342/25 |
| 4,727,373 | 2/1988 | Hoover | |

OTHER PUBLICATIONS

Schleher, "Introduction to Electronic Warfare", Artech House, 1986, pp. 295-299.

Primary Examiner—Gilberto Barron, Jr.
Attorney, Agent, or Firm—Christensen, O'Connor, Johnson & Kindness

[57] ABSTRACT

An over-the-horizon, synthetic aperture radar (OTHSAR) system (10) is disclosed. The OTHSAR system is used to locate moving objects (14) at long distances in response to modulated high-frequency radiation reflected by the objects and distinguishes the objects from stationary clutter (16) that also reflects the radiation. Specifically, a central processor (26) synthesizes information received from an antenna (18) and receiver (22) over an interval of time $t_s$ to enhance azimuth resolution. Although ambiguous Doppler information is likely to be received from the moving object and the stationary clutter, the antenna is selected to have a real antenna beam that resolves the ambiguous data, ensuring that conflicting clutter data is eliminated.

8 Claims, 8 Drawing Sheets

DOPPLER FREQUENCY

FIG.14.

OVER-THE-HORIZON SYNTHETIC APERTURE RADAR

FIELD OF THE INVENTION

This invention relates generally to radar systems and, more particularly, to the range and resolution of such systems.

BACKGROUND OF THE INVENTION

Radar, or radio detection and ranging, typically involves the transmission of electromagnetic energy through the atmosphere to an area of interest. The electromagnetic energy is reflected by objects in the area of interest and the reflections are analyzed to determine the objects' range and direction.

Two parameters of a radar system's performance that are of particular interest are the maximum range at which objects can be detected and the resolution with which they can be located and tracked, once detected. Often, however, one characteristic is enhanced at the expense of the other. For example, systems employing an approach known as over-the-horizon radar (OTHR) can detect objects over long ranges but with only poor azimuth resolution. This is due to their long wavelength and limited antenna size. Alternatively, a technique referred to as synthetic aperture radar (SAR) typically provides good azimuth resolution but, to date, has been applied only to microwave systems where line-of-sight propagation occurs.

OTHR Systems

OTHR systems employ ground-based antennas and transceivers operated in the high-frequency (HF) band to detect objects as far as 2,000 kilometers beyond the visual horizon. OTHR systems typically employ either ionospheric propagation or ground wave propagation of the HF electromagnetic radiation. Ionospheric propagation (commonly referred to as sky wave or skip propagation) involves the refraction of HF waves, emitted from the ground antenna, by one or more layers of the ionosphere to an area of interest beyond the visual horizon. Objects located in the area of interest reflect the waves back to the same layer of the ionosphere for reception at the receiver site.

A receiver analyzes the waves returned to the antenna to identify the object's range and azimuth. In that regard, the time it takes for the waves to return is directly proportional to the object's range. The object's azimuth is resolved by generation of a transmit and receive beam by the antennas. This is known as beam forming by a "real aperture."

The ionosphere relied upon for propagation is composed of a number of vertically stratified layers, any one of which, under proper conditions, may refract waves to and from the antenna. As will be described in greater detail below, the wave's frequency determines the refractive angle and the layer of the ionosphere that will be involved and must be selected to avoid the mutual interference conditions that may be present in the ionosphere. For conventional OTHR systems operated in the 3- to 30-megaHertz HF band, refractions are typically produced by the "F" layer of the ionosphere.

When ionospheric propagation is employed, the system's frequency, the height of the ionospheric layer involved, and the refractive angle all influence the radar system's range. More particularly, for a given angle of incidence between the wave and the refractive layer, higher ionospheric layers will refract waves farther beyond the horizon than lower layers. Because wave frequency determines which layer of the ionosphere will be employed, the OTHR system's range is, thus, frequency dependent.

The primary disadvantage of ionospheric propagation is the variability of the ionosphere. More particularly, the condition of the ionosphere will change in response to daily excitation by the sun, seasonal solar variations, and variations in solar bombardment related to sunspots. These ionospheric variations may significantly affect several aspects of the operation of an OTHR system, including the transmission frequency required to obtain the desired propagation distance and zone of coverage.

As an alternative to ionospheric propagation, ground wave propagation can be employed to detect objects 200 to 400 kilometers beyond the visual horizon. In this form of propagation, electromagnetic waves from the system's antenna are supported by the conductivity of the ground or sea water and propagate next to that medium. As a result, ground wave propagation is not subject to the vagaries of ionospheric fluctuation.

Ground wave propagation does, however, have its disadvantages. Because ground wave propagation involves higher losses than ionospheric propagation, system range is significantly limited. Further, ground wave propagation requires that the waves be vertically polarized and certain objects, such as aircraft, typically have radar cross sections (RCS) that are smaller when exposed to vertically polarized waves. Thus, these objects will be more difficult to detect than if horizontal polarization were employed.

As noted previously, the primary disadvantage of OTHR systems is their relatively poor azimuth resolution, which is limited by the antenna size. For example, an antenna that is 300 meters long and operated at ten megaHertz has a horizontal beam width of six degrees. As a result, the azimuth resolution of an OTHR system employing such an antenna is only 100 kilometers at a 1,000-kilometer range. As will be appreciated, it is often important to know the object's location more precisely. In addition, with such poor azimuth resolution, a relatively large amount of ground clutter is introduced, impairing system performance.

Although the azimuth resolution can be proportionally improved by increasing antenna size, it is difficult to find a suitable location for even a 300-meter antenna. In that regard, the siting of the antenna may conflict with existing area land uses and the land required will certainly contribute to system costs. Further, it may be difficult to find a site having the desired propagation and zone coverage characteristics.

In summary, OTHR systems are characterized by long-range detection capability but by relatively poor azimuth resolution.

SAR Systems

SAR systems employ an antenna located on a moving platform, such as an aircraft, to transmit and receive waves for object detection and tracking. At any one time (one radar transmit/receive cycle), the antenna transmits waves to, and receives waves from, the target. Like OTHR and other radar systems, an object's range is determined by the time taken for wave reflections from the object to return to the system.

In SAR systems, the antenna beam is directed to the side of the aircraft and has a width (before signal processing) that is inversely proportional to the antenna's "real" (physical) aperture. Because the real aperture is relatively small, the real antenna beam is relatively wide and very poor azimuth resolution is achieved. To overcome this limitation, signal processing techniques are used.

More particularly, radiation is emitted from the antenna in periodic pulses of width $\tau$, at a pulse repetition interval (PRI). The antenna receives reflections of these pulses from stationary objects in the area of interest covered by the real antenna beam. The objects impart a relative Doppler frequency to the return signal, which is a function of their azimuth angle. Over an interval of time, the SAR system processes the reflected waves received by the antenna coherently as the aircraft travels some distance $L_s$. To allow the signals to be coherently integrated, navigational information concerning the motion of the aircraft is also required, with an accuracy proportional to a fraction of a wavelength over the distance $L_s$ traveled. Through this process of integration, the SAR system synthesizes an antenna beam that is proportioned to the area traversed by the real antenna beam, storing a two-dimensional map-like array of data corresponding to the area surveyed. The distance $L_s$ is referred to as the "synthetic aperture."

The interval of time during which the signal is integrated is a function of the distance $L_s$ and determines the aperture or width of the synthesized beam and, thus, the system's azimuth resolution. More particularly, the azimuth resolution $\delta Az$ of an SAR system is given as follows:

$$\delta Az = \lambda R/2 L_s \qquad (1)$$

where R = the range of the target, $\lambda$ = the signal's wavelength, and $L_s$ = the synthetic aperture length. The range resolution of the SAR system is determined as follows:

$$\delta R = C\rho/2 = C/2B \qquad (2)$$

where C = the propagation speed of the signal, $\tau$ = the pulse width, and B = the signal's bandwidth.

Conventional SAR systems are operated in the microwave frequency spectrum, typically from 400 MHz to 10 GHz or higher. One characteristic of such systems is that their range is effectively limited to a line-of-sight path. For an aircraft flying at nine kilometer's altitude, the horizon and, hence, complete coverage range is roughly 450 kilometers.

Conventional SAR systems are not generally suited for tracking moving objects because such systems are on moving platforms and undergo motion relative to both stationary and moving objects within an area of interest. Thus, Doppler reflections will be received from both types of objects. Because there is typically at least some overlap in the frequencies of these reflections, the SAR system is unable to tell whether the object is stationary or moving.

As will be appreciated from the preceding remarks, it would be desirable to provide a radar system suitable for use in detecting and tracking moving objects at long ranges, with good azimuth resolution. In summary, SAR techniques provide a high degree of angle resolution for limited antenna size. To date, SAR has been applied only in the microwave region, where line-of-sight propagation occurs.

SUMMARY OF THE INVENTION

In accordance with this invention, a radar system is provided that includes an antenna, a receiver, and synthesizing means. The antenna exhibits a real antenna beam pattern and produces an antenna output in response to received electromagnetic radiation. The receiver receives the antenna output when the antenna output is in the high-frequency range and produces a receiver output. The synthesizing means, in turn, synthesizes the receiver output to establish the synthetic aperture output representative of the receiver outputs produced over a synthetic antenna aperture.

In accordance with a particular aspect of this invention, an over-the-horizon, synthetic aperture radar system is disclosed for locating a moving target object in response to modulated high-frequency electromagnetic radiation reflected by the target object and for distinguishing the target object from stationary, nontarget objects that also reflect the modulated high-frequency electromagnetic radiation. The system includes an antenna having a real antenna beam pattern for producing a Doppler antenna output in response to the modulated high-frequency electromagnetic radiation reflected by the moving target object and the stationary nontarget objects. A receiver is included for receiving the Doppler antenna output and producing a receiver output, including a Doppler target component related to the electromagnetic radiation reflected by the target object and a Doppler clutter component related to the electromagnetic radiation reflected by the nontarget objects. The Doppler target and Doppler clutter components of the receiver output produced by the target and nontarget objects in a select region have distinct frequency ranges. The real antenna beam of the antenna ensures that the receiver output is produced only for target and nontarget objects in the select region. A processor is further included for filtering out the Doppler clutter component of the receiver output to produce a filtered signal and for synthesizing the filtered signal to locate the moving target object. The system operates in the HF radio spectrum (3 to 30 MHz) to allow over-the-horizon operation.

BRIEF DESCRIPTION OF THE DRAWINGS

The invention will presently be described in greater detail, by way of example, with reference to the accompanying drawings, wherein.

DETAILED DESCRIPTION OF THE INVENTION

Figure 1:
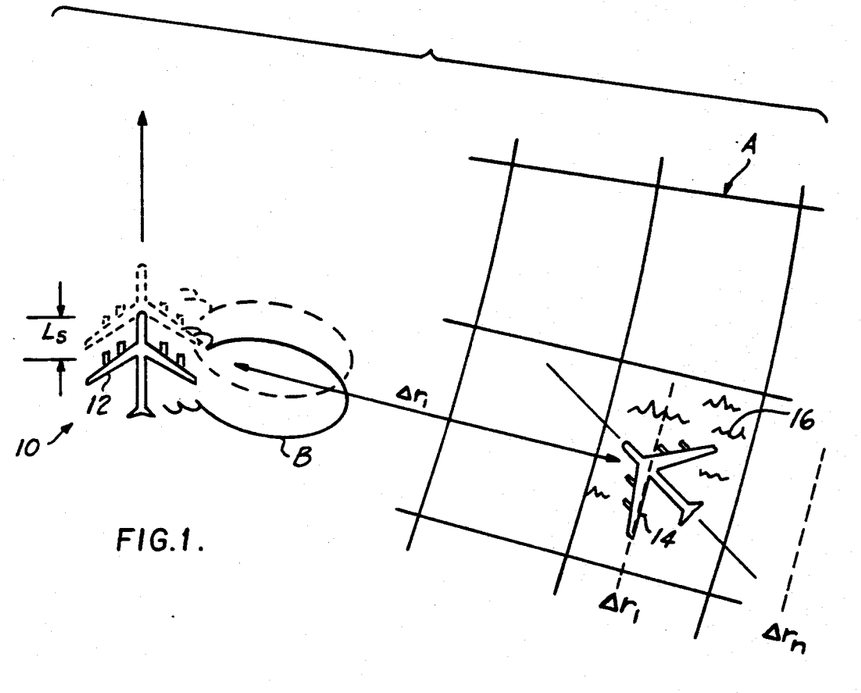
FIGS. 1 and 2 are pictorial schematics of an over-the-horizon synthetic aperture radar (OTHSAR) system constructed in accordance with this invention for use in tracking a moving object such as an aircraft.

FIG. 1 illustrates a radar system 10 constructed in accordance with this invention and incorporating the attributes of OTHR and SAR systems. Specifically, radar system 10 operates in the HF spectrum to achieve the long-range detection capabilities of OTHR and synthesizes the information received over an interval of time and space to achieve the high-azimuth resolution of SAR, while allowing moving objects to be tracked with minimal ground clutter interference. For purposes of this discussion, the system 10 will be referred to as an OTHSAR system.

Figure 2:
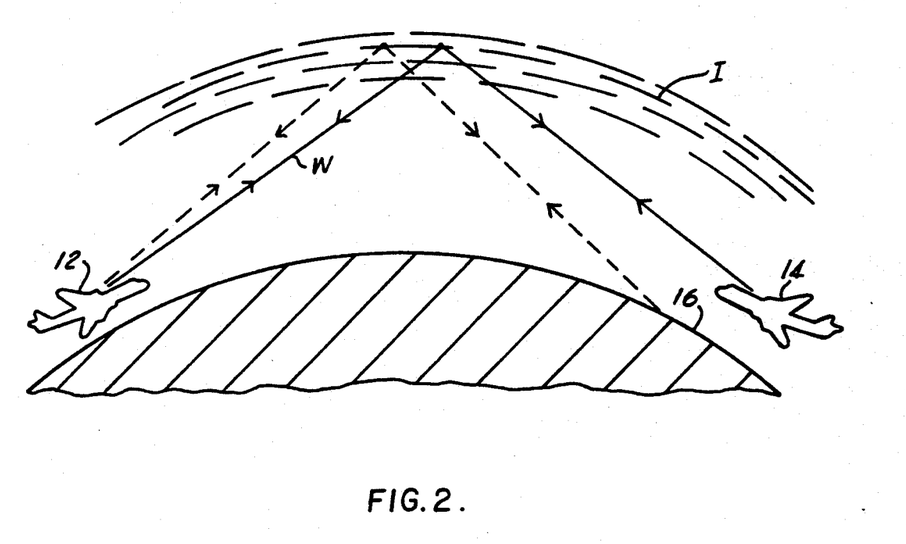

As shown in FIGS. 1 and 2, the OTHSAR system 10 is mounted on an aircraft 12. The OTHSAR system 10 preferably emits horizontally polarized HF waves W that are refracted by the ionosphere I to points far beyond the aircraft's visual horizon. There, moving objects, such as another aircraft 14, and stationary ground clutter 16, reflect the waves to the ionosphere I, where they are refracted back to the OTHSAR system 10 on aircraft 12. The OTHSAR system 10 interprets these refracted wave pulses over an interval of time to detect and track aircraft 14 in the manner described in greater detail below.

Figure 3:
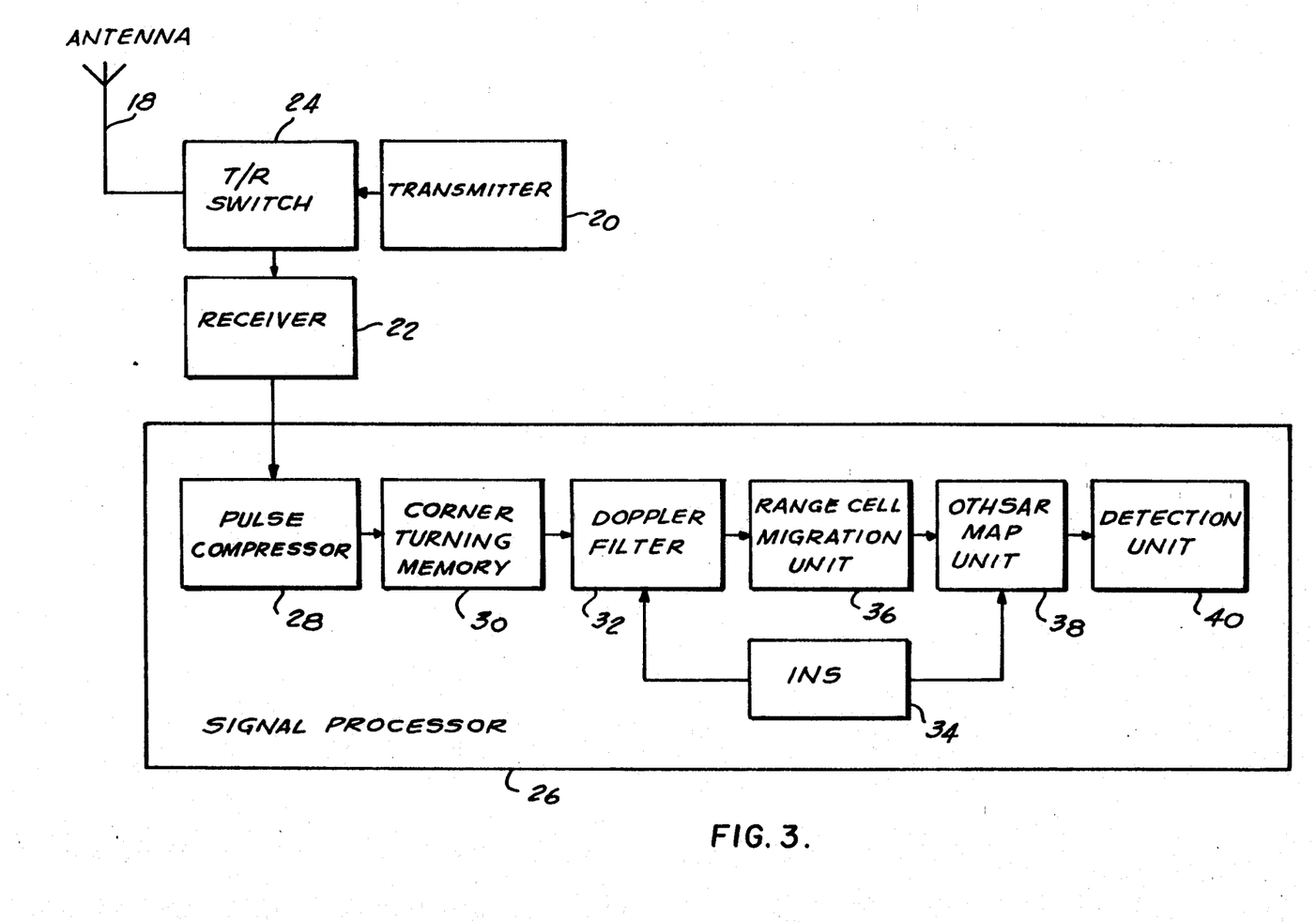
FIG. 3 is a block diagram of an OTHSAR system constructed in accordance with this invention.

A basic OTHSAR system 10 is shown in block form in FIG. 3. As illustrated, system 10 includes an antenna 18 that is responsible for transmitting and receiving the horizontally polarized electromagnetic radiation. The antenna 18 is coupled to a transmitter 20 and receiver 22 by a transmit/receive (T/R) switch or duplexer 24, allowing antenna 18 to be coupled to either transmitter 20 or receiver 22. A central processor 26 is coupled to the transmitter 20, receiver 22, and duplexer 24 to control these elements, synthesizing a relatively large HF antenna aperture to increase azimuth resolution and reduce the effect of clutter. Processor 26 then receives the output of receiver 22 to detect and track aircraft 14.

Figure 4:
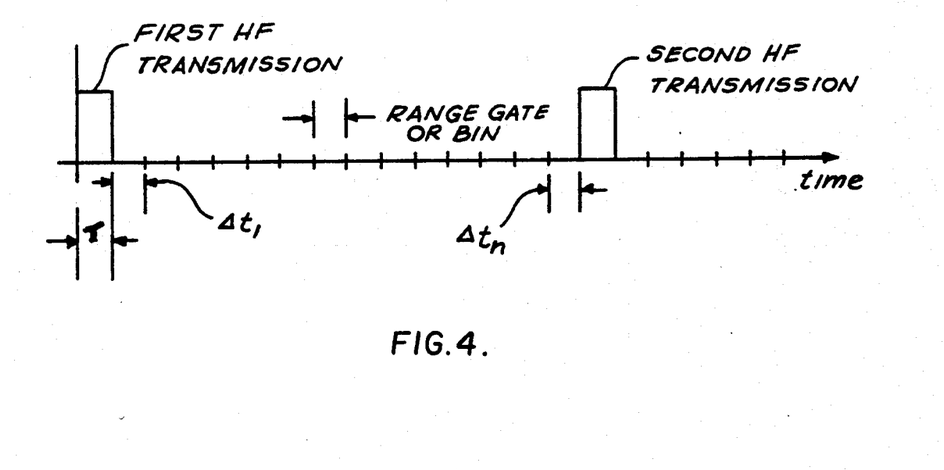
FIG. 4 graphically illustrates the operation of the OTHSAR system of FIG. 3 over an interval of time.

Before discussing these various components of OTHSAR system 10 individually, the general operation of system 10 will be described in greater detail. With aircraft 12 oriented so that the beam of antenna 18 is directed at the azimuth angle of interest, the transmitter 20 is periodically coupled to antenna 18 by the duplexer 24. As a result, pulses of HF electromagnetic energy having a frequency f and pulse width $\tau$ are emitted by antenna 18 at a pulse repetition interval PRI, as shown in FIG. 4. The resultant RF wave pulses are refracted by the ionosphere I to an area of interest A in which the aircraft 14 and clutter 16 are located. Reflected pulses from aircraft 14 and clutter 16 are again refracted by the ionosphere I for return to antenna 18.

Between each pulse of energy emitted by antenna 18, duplexer 24 connects the receiver 22 to antenna 18. The receiver 22 then amplifies the reflected returns and provides amplitude and phase information about each return to processor 26 for analysis. As in a conventional radar system, if a return is received soon after the pulse is transmitted, for example, during the time interval $\Delta t_1$ in FIG. 4, then the pulse traveled a relatively short distance before impinging upon an object and being returned. Thus, the object must be relatively close to aircraft 14, for example, within the range $\Delta r_1$ in FIG. 1. On the other hand, if a return is not received until some later time interval $\Delta t_n$, then the object must be farther away, in some range $\Delta r_n$.

These time intervals and ranges are collectively designated as range cells and are analyzed by processor 26 over an interval of time $t_s$ to determine the aircraft's range. This interval of time $t_s$ is typically on the order of 10 seconds, during which aircraft 12 travels a distance $L_s$, the synthetic aperture length. The processor 26 retains information about the returns received during each of the various time intervals $\Delta t$ following each consecutively transmitted pulse. An object 14 at a given range will then produce an output at the same range cell for each pulse.

The azimuth of object 14 is basically equal to the direction of the real beam formed by the antenna 18 during interval $t_s$. Because the object's Doppler return is also proportional to azimuth, additional azimuth resolution beyond that attributable to the real antenna aperture is obtained, as will be described in greater detail below. The processor 26 coherently adds the data received during this entire time to effectively map in memory a two-dimensional image of the area surveyed.

Because aircraft 12 is typically moving with respect to aircraft 14 and clutter 16, the frequency f1 of the pulses returned from these objects exhibits a Doppler shift proportional to the relative motion. As will be appreciated, over short intervals of time, the relative motion between aircraft 12, aircraft 14, and clutter 16 is constant. As a result, the Doppler shifts induced by the relative motion between aircraft 12 and aircraft 14 will be constant for a given azimuth angle, as will the Doppler shifts induced by the relative motion between aircraft 12 and clutter 16. These "isodops" are illustrated graphically in FIGS. 5 and 6.

As shown, the isodops for stationary ground clutter 16 may have a Doppler frequency extending from about $-4.5$ Hertz to $+4.5$ Hertz (FIG. 5) for angles of $-45$ to $+45$ degrees from perpendicular to the aircraft's flight path (for a radar frequency f of 10 MHz and aircraft 12 velocity of 100 meters/sec). In contrast, the isodops for the aircraft 14, flying on a course perpendicular to the path of aircraft 12, may range from $+5$ to $+14$ Hertz (FIG. 6) for this same $-45$ to $+45$-degree range (assume aircraft 14 is flying at 200 m/sec). As will be appreciated, the Doppler resolution is poor for the angular range of roughly 0 to $+45$ degrees and an aircraft in this angular sector will have about the same relative Doppler frequency regardless of its position. On the other hand, the isodops in the $-45$ to 0 degree range indicate that Doppler resolution here is quite good. Objects at different angular positions in this range produce Doppler shifts varying from 5 to 14 Hertz. The gradient in this area is about 100 to 130 milliradians per Hertz. Thus, if the system 10 processes data for 10 seconds, it will have a Doppler resolution of 0.1 Hertz, corresponding to about 10 kilometers of azimuth resolution at 1,000 kilometers' range. This resolution is much better than that achievable using only the unprocessed antenna beam. Although this is basically a synthetic aperture radar (SAR) technique, it is applied to a moving target to obtain high angular resolution and to discriminate the target from clutter.

Figure 5:
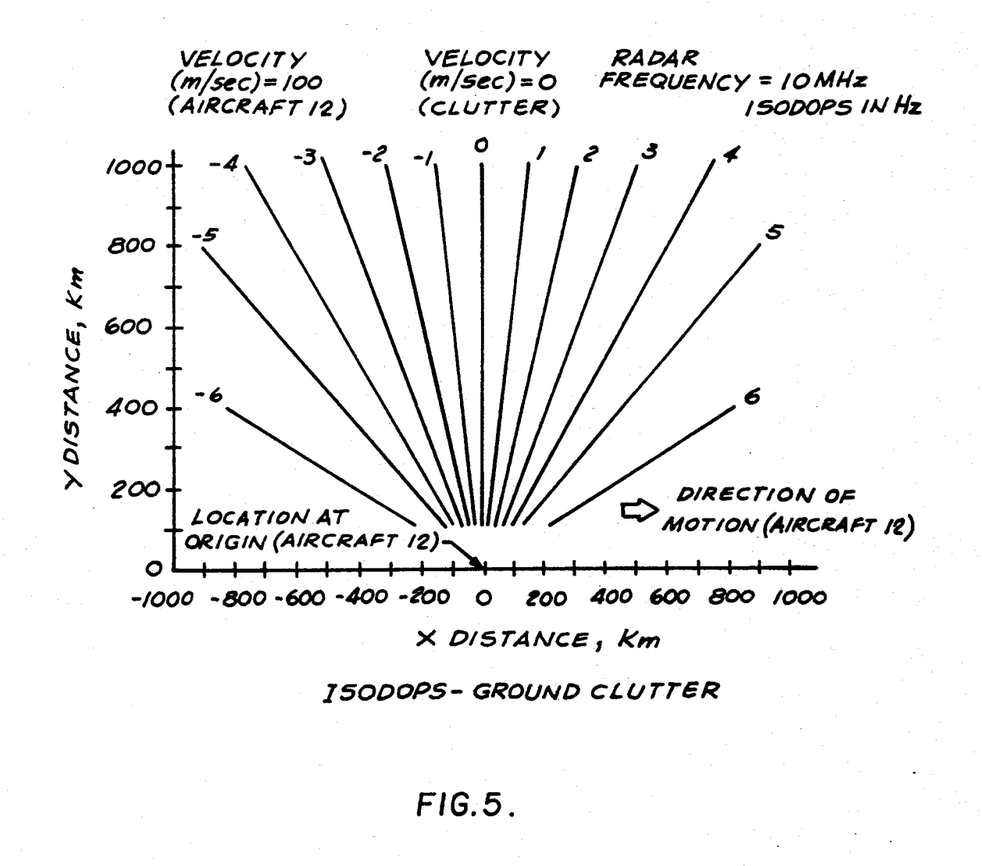
FIG. 5 is a plot of the isodop pattern received by the OTHSAR system of FIG. 3 from ground clutter.
Figure 6:
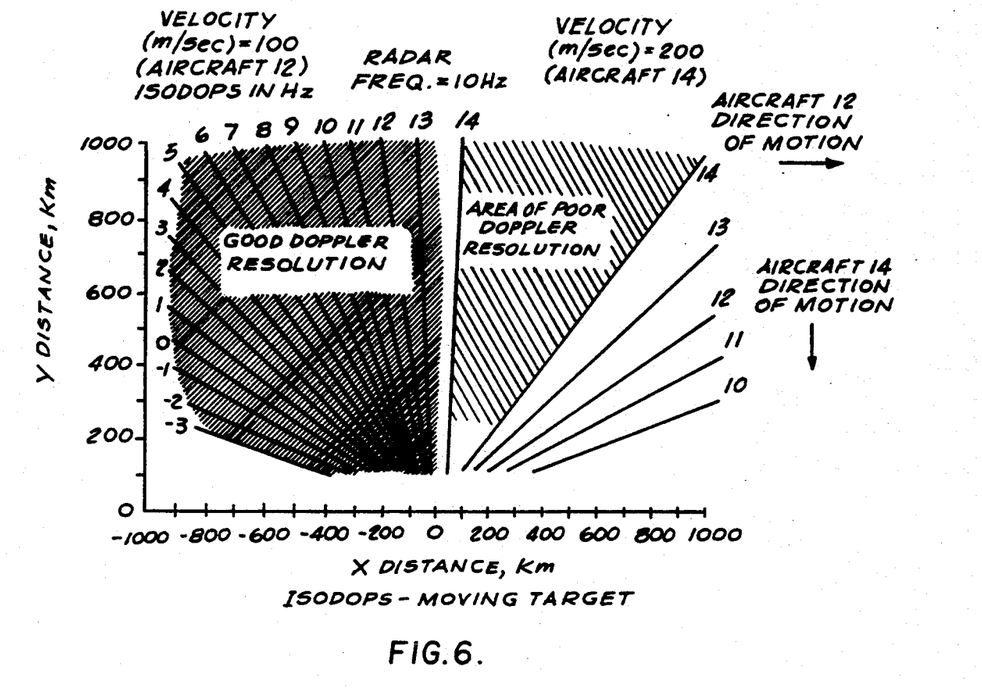
FIG. 6 is a plot of the isodop pattern received by the OTHSAR system of FIG. 3 from the moving aircraft.

As will be appreciated from a comparison of FIGS. 5 and 6, if the processor 26 were provided with the full information contained in these two FIGURES, a four-Hertz frequency shift could be ambiguously construed as the Doppler shift induced by either the moving aircraft 14 at a negative azimuth angle or the stationary ground clutter 16 at a positive azimuth angle. Thus, some way of resolving this ambiguity is required.

In the preferred embodiment, this is accomplished by selecting an antenna 18 having a real antenna beam whose lobes are effectively unresponsive to ambiguous isodop data. More particularly, referring to FIG. 7, the isodop patterns of FIGS. 5 and 6 are superimposed upon a schematic illustration of aircraft 12 and its associated real antenna beam B. As shown, and as will be described in greater detail below in connection with antenna 18, the azimuth coverage of antenna beam B excludes all potentially ambiguous isodops, allowing processor 26 to positively identify the returns associated with aircraft 14.

Figure 7:
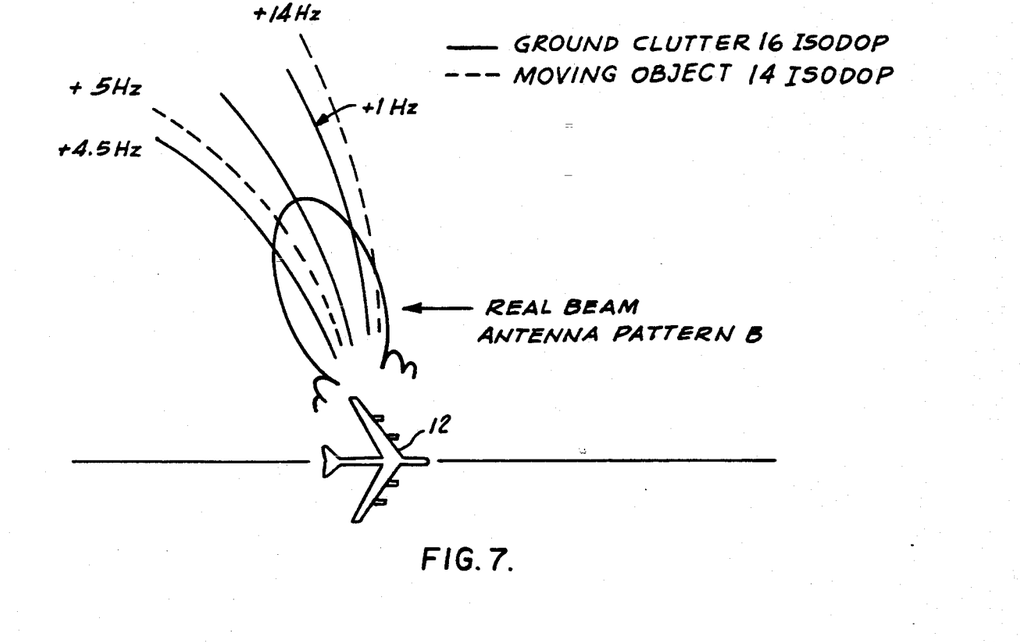
FIG. 7 illustrates how the real antenna beam of the OTHSAR system is used to resolve Doppler ambiguity between signals received from the moving aircraft and the ground clutter.
Figure 8:
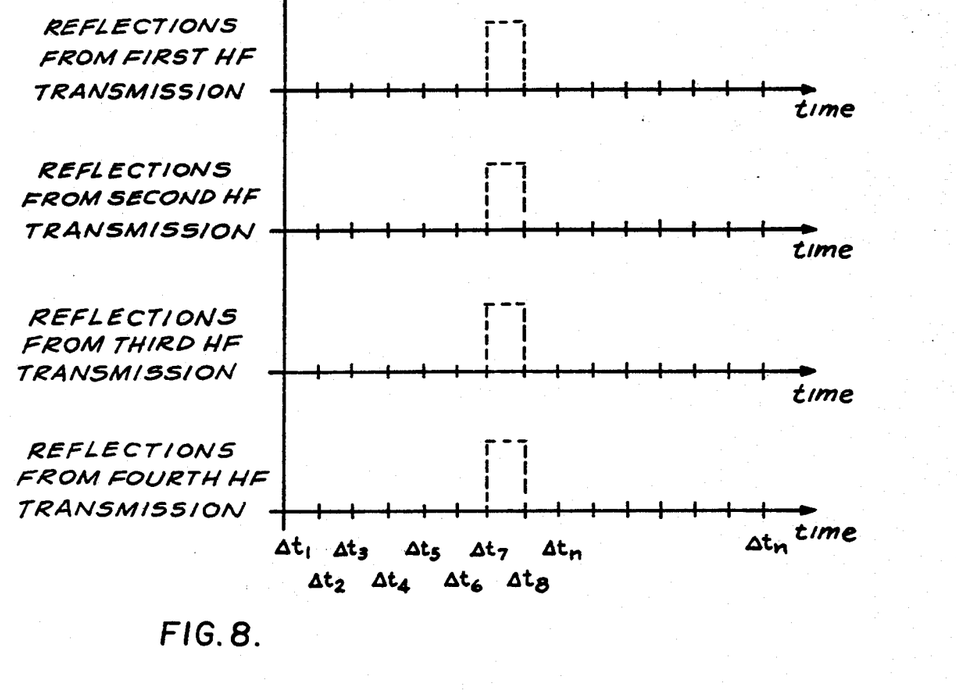
FIG. 8 illustrates one way in which the Doppler returns received by the OTHSAR system over an interval of time are stored.

More particularly, assume the aircraft 12 has an antenna 18 with a real beam width of 90 degrees oriented normal to the aircraft's flight path. The Doppler shifts produced by ground clutter 16 falling within this real antenna beam would vary between approximately −6 and +6 Hertz. On the other hand, the aircraft 14 creates Doppler shifts from +1 to +12 Hertz over the same angular extent. Thus, depending on its azimuth, the aircraft 14 might appear ambiguously as stationary clutter.

By generating a specific real antenna beam B, however, this ambiguity can be eliminated. In that regard, with the antenna's beam B squinted slightly to the rear as shown in FIG. 7, the real beam B will include only the −4.5 Hertz to +1 Hertz isodops for ground clutter 16 and the +5 Hertz to +14 Hertz isodops for aircraft 14. Thus, the real beam pattern B of the antenna 18 resolves the ambiguity, ensuring that no ambiguous data will be received by receiver 22.

As one final point before turning to a discussion of the components of system 10, it should be noted that the characteristics of ionosphere I are frequency dependent. Thus, the angle of refraction as well as the refracting layer involved will likely vary with frequency. As shown by the broken lines in FIG. 2, frequency may thus affect the system's zone of coverage. It should be noted, however, that the ionosphere is not particularly stable and the frequency characteristics of a given layer may vary significantly over a given interval of time. However, these issues have been successfully dealt with by existing land-based OTHR systems.

Addressing now the various components of OTHSAR system 10 individually, antenna 18 may be any one of a variety of types including log-periodic, dipole or monopolar array, and slot. Regardless of the type selected, however, the antenna 18 has a number of constraints. For example, antenna 18 must have a certain angular resolution, allowing system 10 to distinguish between the Doppler returns from aircraft 14 and the returns from ground clutter 16, as described above. In that regard, antenna 18 may suitably exhibit a three-dB beam width of 45 degrees or less, and side lobes of less than 20 dB below the main lobe, in the direction of the ambiguous ground clutter data to be ignored.

Antenna 18 should also exhibit a "front-to-back" of greater than 20 dB. This prevents antenna 18 from detecting unwanted clutter or objects on the other side of aircraft 12. As will be discussed in greater detail below, it may also be desirable to operate system 10 at any one of a plurality of frequencies. The antenna 18 should have a broad instantaneous bandwidth of, for example, 100 kiloHertz, and should be tunable to several frequency ranges within the 6 to 25 megaHertz spectrum.

To enhance the RCS of aircraft 14 and to reduce sea reflectivity, the antenna 18 of OTHSAR system 10 should also be suitable for use with horizontal wave polarizations. Because the ionosphere may cause a refracted wave's polarization to change, due to a phenomenon known as Faraday rotation, however, the antenna 18 must be constructed to allow waves to be transmitted and received along nonhorizontal polarizations. Upon rotation by the ionosphere I, these waves will then have the desired horizontal polarization in the area of interest. One way of accomplishing this is by employing crossed dipoles as the antenna elements and controlling the relative power to each.

Finally, although not required, it may be desirable to employ an antenna 18 that allows some control over the antenna's beam direction. For example, with an array of antenna elements employed, the antenna beam B can be controlled by regulating the phase of the signals received from, and applied to, the various elements. The use of such a steerable antenna beam B allows the OTHSAR system 10 to cover a wider area of interest A and allows the system 10 to process information from aircraft 14 having velocity range.

Addressing now the transmitter 20 of OTHSAR system 10, transmitter 20 should exhibit a high peak power to overcome losses in transmission. The transmitter 20 also must be operable over a wide range of frequencies, to allow the desired performance characteristics to be achieved under different ionospheric conditions. Further, because the transmissions must be modulated to allow the range of aircraft 14 to be determined, transmitter 20 must be capable of either pulsed operation or frequency-modulated continuous-wave operation. For the present discussion, however, transmitter 20 is treated as producing pulsed signals.

The receiver 22 is preferably a conventional spectrum-monitoring receiver. Thus, receiver 22 can monitor a number of frequency channels at the same time, allowing the local condition of a desired frequency spectrum segment to be checked before a transmission occurs. As with existing OTH systems, if mutual interference between the OTHSAR system 10 and another station, or some other form of ionospheric interference, would occur for the channel selected, a different interference-free channel will be employed. While that transmission is occuring, the receiver 22 is then monitoring other channels for the next suitable interference-free-channel.

In addition to allowing the available clear channels to be identified, this frequency "hopping" of receiver 22 and transmitter 20 ensures continuous coverage of the area under surveillance. More particularly, because the ionosphere exhibits different degrees of refraction at different frequencies, the area of coverage can be altered by changing the operating frequency of system 10. As a result, the OTHSAR system 10, like existing OTHR systems, allows gaps in earlier coverage to be filled by changing the frequency.

The duplexer 24 is included in OTHSAR system 10 to allow the transmitter 20 and receiver 22 to share the common antenna 18. Duplexer 24 is preferably a switching-type device controlled by central processor 26 to selectively couple antenna 18 to the desired one of transmitter 20 or receiver 22.

Turning now to discussion of the central processor 26, central processor 26 includes a number of components. The central processor 26 is responsible for controlling the frequency and other operational aspects of transmitter 20, receiver 22, and duplexer 24. The central processor 26 is further employed to process data from the receiver 22 over an interval of time and detect and track the range and azimuth of aircraft 14 with a desired resolution.

As shown in FIG. 3, central processor 26 includes a pulse compressor 28 that is employed to effectively process pulses that have been dispersed over a wider frequency band B, shortening their processed duration $\tau$. As will be appreciated from Equation (2) above, the result is an enhanced range resolution $\sigma R$ for system 10. To understand this relationship, assume that a very long pulse $\tau$ is produced and two closely spaced objects are in the area of interest. When the more distant object begins reflecting the leading portion of the pulse, the closer object will still be reflecting a trailing portion of the pulse. As a result, the antenna 18 will receive a continuous reflection from the two objects and will be unable to distinguish them in range.

On the other hand, if a pulse having a sufficiently short duration is employed, reflections from the nearer object will be finished before the pulse impinges upon the more distant object. As a result, the antenna 18 will receive two independent and distinguishable reflections. The compression employed by pulse compressor 28 to achieve this increase in resolution may be accomplished by, for example, linear FM modulation (CHIRP).

From the pulse compressor 28, signals are applied to a corner-turning memory 30. The corner-turning memory 30 is included to allow Doppler filter 32 to process information during which the synthetic aperture is being produced.

From the corner-turning memory 30, signals are applied to a Doppler filter 32 that also receives an input from the aircraft inertial navigation system 34. The inertial navigation system 34 provides Doppler filter 32 with information concerning, for example, the relative velocity of aircraft 12 with respect to the stationary ground clutter 16. Thus, with the ambiguous Doppler data removed by antenna 18, the Doppler filter 32 can identify and remove the Doppler data associated with ground clutter, so that only information associated with the aircraft 14 is processed.

From Doppler filter 32, the signal is passed to a range cell migration unit 36. As previously noted, the range cells correspond to the various expected ranges in which the aircraft 14 may be located with respect to aircraft 12. If the range of aircraft 14 is changing in time, it is possible that aircraft 14 will produce reflections in more than one of the range cells associated with a particular sequence of transmitted pulses. Similarly, if aircraft 14 migrates in both range and azimuth, it may produce reflections in different range cells associated with adjacent transmissions. As will be appreciated, without further information these reflections might be interpreted as separate objects 14. The range cell migration unit 36 distinguishes such aircraft migrations to avoid their erroneous interpretation.

Figure 9:
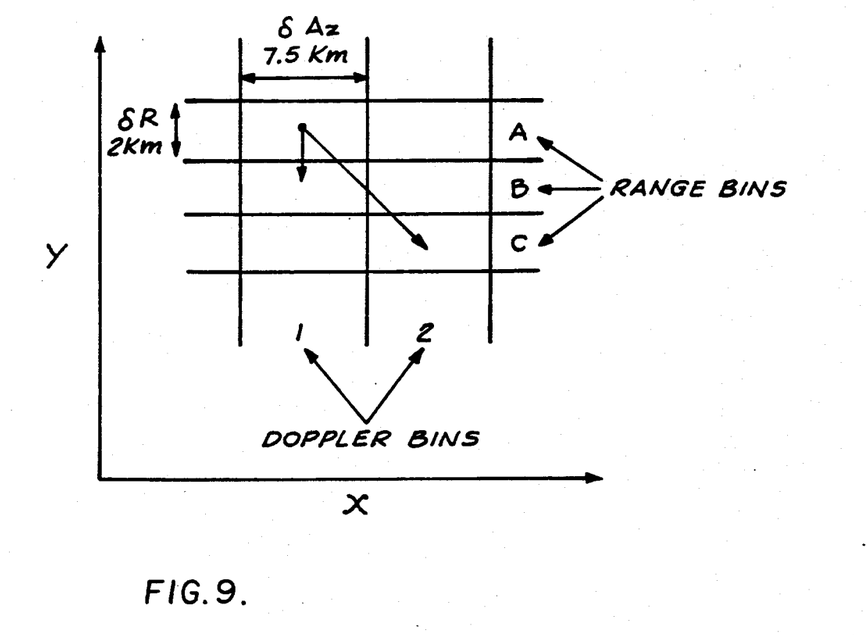
FIG. 9 is a graph illustrating possible range cell migration of an aircraft tracked by the OTHSAR system of FIG. 3.

To understand how migration unit 36 works, reference is had to FIG. 9. There a grid schematically illustrating various range gates associated with consecutive pulses of system 10 is shown. As illustrated, the migration of aircraft 14 within this grid may be in range only, azimuth only, or range and azimuth.

As noted previously, if aircraft 14 is migrating in range only, the aircraft 14 may produce reflections in two range gates or bins associated with a single transmission, for example, range bins A and B associated with Doppler bin 1. The migration unit 36 monitors the range gates over several aperture intervals $L_s$ to determine whether the reflections are attributable to multiple objects or one moving object. If the object is identified as moving, the change in range is determined. It should be noted that the range resolution of the OTHSAR system 10 is on the order of 2000 m and it is unlikely that the aircraft 14 would be traveling fast enough to produce reflections in two range cells following a single pulse.

If the aircraft 14 is migrating in azimuth only, reflections will continue to be received in the same range gate inervals for consecutive pulses, provided the migration is not excessive, but will exhibit a different Doppler shift. The migration unit 36 tracks this Doppler shift for fixed-range migrations and determines the azimuth change attributable to the frequency shift.

Finally, when aircraft 14 is migrating in both range and azimuth, consecutive returns may fall within different range gate intervals and may exhibit a Doppler shift as well. The migration unit 36 performs both of the preceding functions to identify the aircraft's range and azimuth change.

The OTHSAR map section 38 receives the outputs of the other sections to produce a two-dimensional map of the region A under surveillance. From that map, the detection section 40, which may include a display, allows the target to be detected and located. By monitoring the map over adjacent synthetic aperture intervals, the detection section 40 uses the changing location of the aircraft 14 to determine its velocity.

The OTHSAR system 10 shown in FIG. 1 can be referred to as a monostatic system. More particularly, the transmitter 20 and receiver 22 are both located on a single, moving platform, i.e., the aircraft 12. As will be appreciated, however, the invention can easily be implemented in a bistatic approach, which is effectively the same as that shown in FIG. 1, with the exception that the transmitter 20 is now on the ground. This is illustrated schematically in the block diagram of FIG. 3, with the transmitter 20 shown in broken lines.

The bistatic approach has several advantages over the monostatic approach described above. For example, the aircraft 12 does not require an HF transmitter, greatly reducing the transmitter's size, weight, and power requirements. Because the aircraft 12 no longer emits signals, it is also less susceptible to detection. In addition, the isodops produced by aircraft 14 flying within expected velocity limits will be well removed from the isodops produced by the clutter 16. As a result, the antenna beam B of the antenna 18 aboard aircraft 12 need not be specially tailored, as is the case for monostatic SAR. The Doppler gradient exhibited by a bistatic system is also much greater than the gradient produced by a monostatic system, effectively giving the bistatic system much better azimuth resolution. In addition, the separation between the transmitter and receiver in a bistatic system makes continuous-wave operation permissable. The receiver can also "sense" the condition of the ionosphere by receiving a signal directly from the transmitter. Finally, spectrum monitoring and control of transmitted frequencies can be performed at the transmitter site, reducing equipment required by the aircraft 12.

Regardless of whether a monostatic or bistatic approach is taken, if ionospheric propagation is employed, the problem of ionospheric instability must be dealt with. In that regard, the OTHSAR system 10 requires a stable or known phase path for roughly ten seconds to reconstruct the received signals and the process information contained therein to form a synthesized aperture. Disruptive ionospheric variations must be limited or known during that interval.

Figure 10:
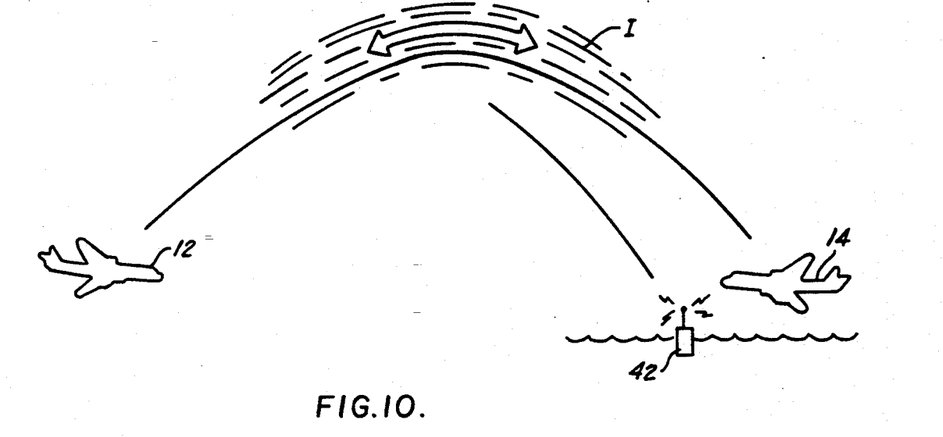
FIGS. 10 through 14 illustrate several ways in which an OTHSAR system can compensate for ionospheric propagation phase errors.

To minimize the influence of ionospheric variations, several approaches are contemplated to recover the relative phase of the propagation path. First, as shown in FIG. 10, a remote transmitter 42 can be employed to transmit a pulsed or continuous-wave reference signal to the ionosphere I and, then, OTHSAR system 10. The OTHSAR system 10 then analyzes ionospheric conditions based upon the ionosphere's impact on the reference signal. More particularly, the signal processor 26 of OTHSAR system 10 detects the phase of the received reference signal and uses that information to phase-correct the received echo phase information from aircraft 14, allowing that information to be coherently integrated over the synthetic aperture interval. The transmitter 42 may be, for example, a beacon transmitter, such as a floating sea buoy, or an existing shortwave broadcasting or communications station.

Figure 11:
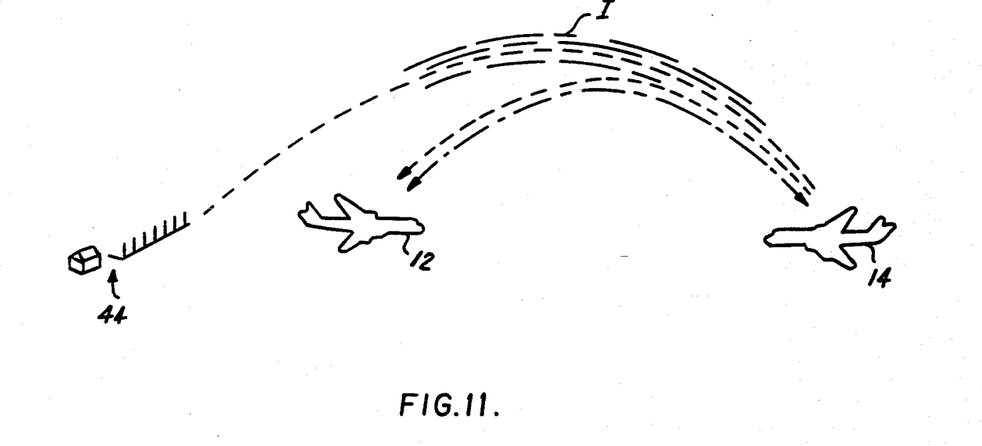

Alternatively, a land-based OTHR can be used to measure the condition of the ionosphere. For example, as shown in FIG. 11, a land-based OTHR system 44 transmits signals via the ionosphere I to aircraft 14, and the back-scattered signal is then received by OTHSAR system 10. Because the land-based OTHR system 44 has a much higher power aperture product (i.e., antenna gain × transmitter power) than OTHSAR system 10, the backscattered OTHR signal has a sufficiently large signal-to-noise ratio to allow it to be phase detected. The OTHSAR system 10 then uses this phase information to provide the phase corrections necessary to coherently integrate the received OTHSAR signals over the synthetic aperture interval.

Figure 12:
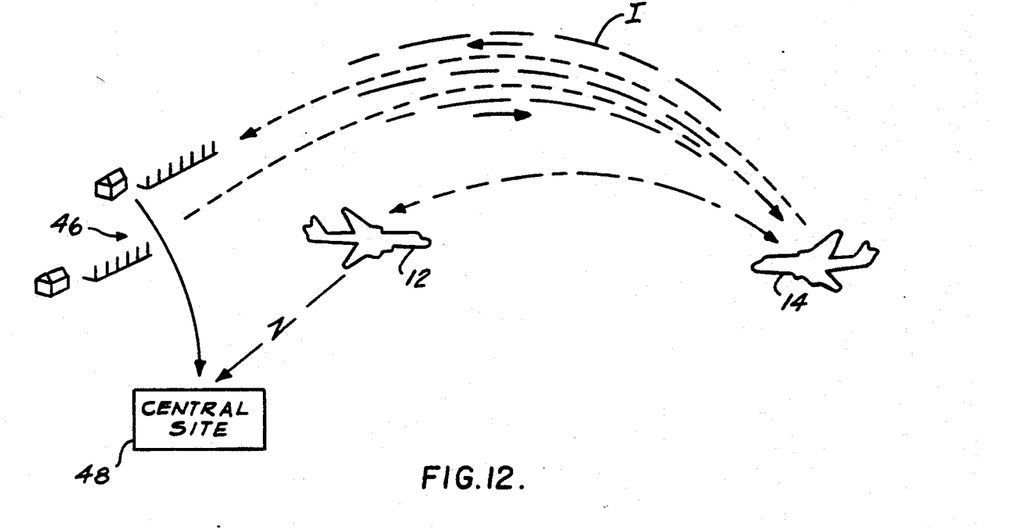

A variation of this approach is shown in FIG. 12. Again, an OTHR system 46 is used to monitor the phase path, while the OTHSAR system 10 collects data. Now, however, the land-based OTHR system 46 both transmits and receives. The OTHR system 46 detects phase on a pulse-to-pulse basis and computes any relative phase changes. At the same time, the OTHSAR system 10 collects its data on a nearby frequency channel. Both systems 10 and 46 then transmits their data to a central processing site 48, where the phase adjustments indicated by system 46 are made to the data collected by OTHSAR system 10.

Figure 13:
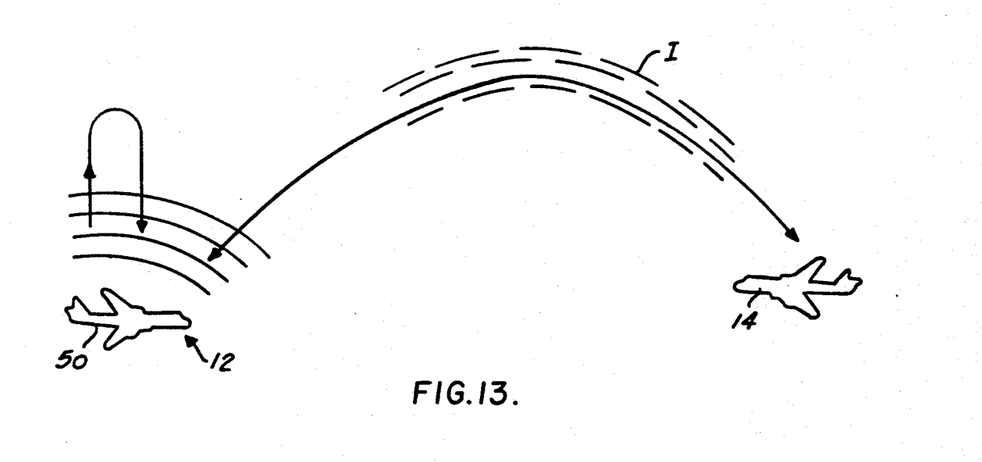

As yet another way to circumvent ionospheric propagation phase errors, an ionospheric sounder or ionosound 50 is employed to probe the ionosphere and measure the height of its various layers, as shown in FIG. 13. The layer height can vary, due to solar radiation changes, and the affects the path length and, hence, phase of the reflected waves received by OTHSAR system 10. The OTHSAR system 10 then determines the phase error attributable to height variations and correlates the OTHSAR system 10 output accordingly.

Figure 14:
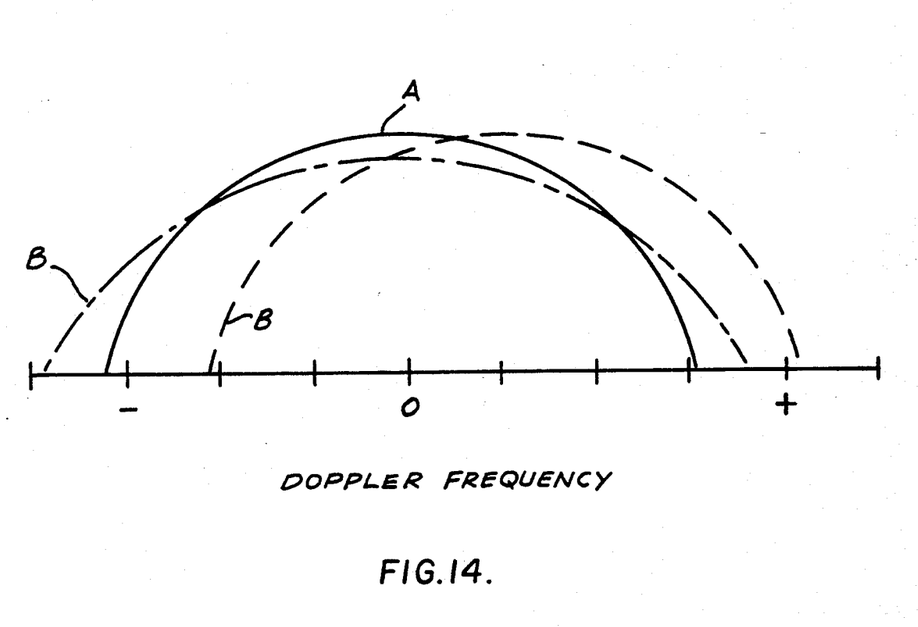

Finally, clutter processing can be employed to ensure that the operation of OTHSAR system 10 is not influenced by phase errors. In that regard, a great deal of the energy received by the antenna 18 of OTHSAR system 10 is in the form of clutter, or backscattered waves from the environment of aircraft 14. The frequency spectrum of the clutter is a function of the antenna pattern and the relative motion between OTHSAR system 10 and the portion of the aircraft 14 environment causing the return. If the ionosphere is perfectly stable (i.e., exhibits no pulse-to-pulse changes), the spectrum will have a certain shape, shown, for example, as curve A in FIG. 14. On the other hand, if ionospheric instabilities introduce pulse-to-pulse phase changes, the shape of the spectrum may change, as illustrated by curves B of FIG. 14. The processor 26 of OTHSAR system 10 can then be used to identify the phase shifts corresponding to changes in the spectrum and correct the data collected by OTHSAR system 10 accordingly.

It is anticipated that the OTHSAR system 10 would be employed in combination with other systems. For example, a conventional microwave radar system could be added to OTHSAR system 10 to form a more advanced system. The OTHSAR system 10 would then identify objects at long range and switch over to the conventional line-of-sight, micro-based system at closer range. Alternatively, in a sensor fusion approach, the OTHSAR system 10 could be used to monitor a relatively large area, while the conventional micro-based system is used to provide more detailed information concerning a more limited area of interest.

Regardless of its configuration, the OTHSAR system 10 has the ability to detect objects 14 at long range with good azimuth resolution. In addition, ambiguous Doppler returns produced by moving objects 14 and stationary clutter 16 can be distinguished. Further, the system 10 is not unduly disrupted by ionospheric instability, if the ionosphere is selected as the medium of propagation.

Those skilled in the art will recognize tht variants of the configurations disclosed herein can be made without departing from the scope and the spirit of the invention. The invention describes a synthetic aperture radar system that utilizes ionospheric or ground wave propagation and can operate in either a monostatic or bistatic mode. Further, it will be recognized that the processing of synthetic aperture data can be altered in a number of ways and that the OTHSAR system can be combined with other radar systems to advantage. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. A radar system for determining the location of a target object under a first condition, the target object being located in one of a plurality of search units forming a composite search area, said first condition occuring when the search unit including the target object has not been identified, said radar system comprising:
a transmitter for transmitting electromagnetic radiation to a region including the target object;
an antenna, exhibiting a real antenna beam pattern, for producing an antenna output in response to received electromagnetic radiation;
a receiver for receiving said antenna output when said antenna output is in the high frequency range and producing a receiver output;

synthesizing means for synthesizing said receiver output to establish a synthetic aperture output representative of said receiver outputs produced over a synthetic antenna aperture;

processing means for processing said synthetic aperture output to determine the location of the target object under the first condition;

a secondary radar system for locating the target object under a second condition; and said second condition occuring when the search unit including the target object has been identified.

2. A radar system for determining the location of a target object under a first condition, said first condition occurring when said target object is located more than a predetermined distance from the antenna, said radar system comprising:

an antenna, exhibiting a real antenna beam pattern, for producing an antenna output in response to received electromagnetic radiation;

a receiver for receiving said antenna output when said antenna output is in the high frequency range and producing a receiver output; and synthesizing means for synthesizing said receiver output to establish a synthetic aperture output representative of said receiver outputs produced over a synthetic aperture;

processing means for processing said synthetic aperture output to determine the location of the target object;

a transmitter for transmitting electromagnetic radiation to a region including the target object; and a secondary radar system for locating the target object under a second condition, wherein said second condition occurs when said target object is located less than or equal to the predetermined distance from the antenna.

3. A radar system comprising:

an antenna, exhibiting a real antenna beam pattern, for producing an antenna output in response to received electromagnetic radiation propagated in the ionosphere;

a receiver for receiving said antenna output when said antenna output is in the high frequency range, and producing a receiver output;

synthesizing means for synthesizing said receiver output to establish a synthetic aperture output representative of said receiver outputs produced over a synthetic antenna aperture; and phase error correction means for allowing said synthetic aperture output to be produced substantially independent of phase errors introduced into said receiver output by variations in the ionosphere.

4. The radar system of claim 3, wherein said phase error correction means comprises remote transmission means for providing reference electromagnetic radiation to said antenna, said reference electromagnetic radiation including information representative of the phase errors introduced into said receiver output by variations in the ionosphere.

5. The radar system of claim 3, wherein said phase error correction means comprises an over-the-horizon radar for propagating reference electromagnetic radiation in the ionosphere, said reference electromagnetic radiation being influenced by the phase errors introduced into said receiver output by variations in the ionosphere and being usable by said system to correct for such phase errors.

6. The radar system of claim 3, wherein said phase error correction means comprises an ionosound for producing an output representative of the condition of the ionosphere and the phase errors introduced into said receiver output by variations in the ionosphere.

7. The radar system of claim 3, wherein said receiver output includes a clutter spectrum component, and wherein said phase error correction means comprises clutter processing means for monitoring said clutter spectrum component to identify and correct for phase errors introduced into said receiver output by variations in the ionosphere.

8. A method of locating a target object comprising the steps of:

receiving ionospherically propagated electromagnetic radiation at an antenna;

producing a receiver output when the ionospherically propagated electromagnetic radiation received by the antenna is in the 3-to-30 MHz frequency range;

synthesizing the receiver output to establish a synthetic aperture output representative of the receiver outputs produced over a synthetic antenna aperture; and processing the synthetic aperture output to locate the target object.

* * * * *

UNITED STATES PATENT AND TRADEMARK OFFICE
CERTIFICATE OF CORRECTION

PATENT NO. : 5,160,932
DATED : November 3, 1992
INVENTOR(S) : J.G. Bull It is certified that error appears in the above-identified patent and that said Letters Patent is hereby corrected as shown below:

| COLUMN | LINE | |
|---|---|---|
| 3 | 42 | "$\delta R = Cp/2 = C/2B$" should read --$\delta R = C\tau/2 = C/2B$-- |
| 3 | 51 | "kilometer's" should read --kilometers'-- |
| 7 | 65 | After "back" insert --ratio-- |
| 8 | 28 | After "having" insert --a wider-- |
| 8 | 52 | "occuring" should read --occurring-- |
| 8 | 54 | "free-channel" should read --free channel-- |
| 9 | 3 | After "to" insert --a-- |
| 10 | 4 | After "if" insert --the-- |
| 10 | 20 | "inervals" should read --intervals-- |
| 10 | 66 | "permissable" should read --permissible-- |
| 11 | 52 | "transmits" should read --transmit-- |
| 11 | 61 | After "the" (first occurence) insert --height-- |
| 12 | 26 | "micro-based" should read --microwave-based-- |
| 12 | 37 | "tht" should read --that-- |
| 12 | 58 & 59 | "occur-ing" should read --occurring-- |
| 13 | 10 | "occuring" should read --occurring-- |

Signed and Sealed this

Ninth Day of November, 1993

*Attest:*

BRUCE LEHMAN

*Attesting Officer*  Commissioner of Patents and Trademarks